(12) United States Patent  (10) Patent No.:  US 8,510,548 B1
Markov et al.  (45) Date of Patent:  Aug. 13, 2013

(54) METHOD AND DISCOVERY SYSTEM FOR DISCOVERING ENCRYPTED PEER-TO-PEER (EP2P) NODES ASSOCIATED WITH A PARTICULAR EP2P NETWORK

(75) Inventors: Andriy Markov, Ottawa (CA); Dmytro Kukulniak, Yalta (UA); Bogdan Materna, Ottawa (CA)

(73) Assignee: ReVera Networks Inc. (CA)

( * ) Notice: Subject to any disclaimer, the term of this patent is extended or adjusted under 35 U.S.C. 154(b) by 0 days.

(21) Appl. No.: 13/244,084

(22) Filed: Sep. 23, 2011

Related U.S. Application Data

(60) Provisional application No. 61/386,059, filed on Sep. 24, 2010, provisional application No. 61/386,063, filed on Sep. 24, 2010, provisional application No. 61/386,068, filed on Sep. 24, 2010, provisional application No. 61/386,074, filed on Sep. 24, 2010.

(51) Int. Cl.
*H04L 29/06* (2006.01)

(52) U.S. Cl.
USPC .......................................................... 713/150

(58) Field of Classification Search
USPC .......................................................... 713/150
See application file for complete search history.

(56) References Cited

U.S. PATENT DOCUMENTS

| | | | |
|---|---|---|---|
| 5,469,363 A * | 11/1995 | Saliga ............................ | 700/225 |
| 7,188,089 B2 * | 3/2007 | Goldthwaite et al. .......... | 705/67 |
| 7,206,943 B2 * | 4/2007 | Kobayashi et al. ............ | 713/193 |
| 7,646,728 B2 | 1/2010 | Fahmy ........................... | 370/252 |
| 7,712,131 B1 * | 5/2010 | Lethe .............................. | 726/20 |
| 7,958,250 B2 | 6/2011 | Sridhar et al. ................. | 709/230 |
| 7,979,703 B2 * | 7/2011 | Ellison et al. .................. | 713/168 |
| 2006/0068806 A1 | 3/2006 | Nam et al. ..................... | 455/452.2 |
| 2008/0165765 A1 * | 7/2008 | Neuhaus ......................... | 370/352 |
| 2009/0299937 A1 | 12/2009 | Lazovsky et al. .............. | 706/47 |
| 2010/0064362 A1 | 3/2010 | Materna et al. ................ | 726/15 |
| 2010/0145912 A1 | 6/2010 | Li et al. .......................... | 707/622 |
| 2011/0010421 A1 * | 1/2011 | Chavez et al. ................. | 709/204 |
| 2011/0035795 A1 * | 2/2011 | Shi .................................. | 726/13 |
| 2011/0153809 A1 | 6/2011 | Ghanem et al. ............... | 709/224 |

OTHER PUBLICATIONS

O'Neil, S., "Skype Library RC4 v1.109", http://cryptolib.com/ciphers/skype/skype_rc4.c, published Jul. 7, 2010, accessed Sep. 22, 2011.

Hjelmvik, E. and John, W., "Breaking and Improving Protocol Obfuscation", Department of Computer Science and Engineering, Chalmers University of Technology, Technical Report No. 2010-05, ISSN 1652-926X, Sweden, Jul. 27, 2010.

* cited by examiner

*Primary Examiner* — Kambiz Zand
*Assistant Examiner* — Abiy Getachew
(74) *Attorney, Agent, or Firm* — Matthew A. Pequignot; Pequignot + Myers LLC

(57) ABSTRACT

A method and a discovery system are provided for discovering encrypted peer-to-peer (EP2P) nodes associated with a particular EP2P network. An EP2P connection request associated with the EP2P network is sent to each of a plurality of initial IP address and port number combinations. If an EP2P connection response associated with the EP2P network is received from a particular initial IP address and port number combination, it is determined to belong to an initial EP2P node associated with the EP2P network. An EP2P discovery request associated with the EP2P network is then sent to the particular initial IP address and port number combination, and an EP2P discovery response associated with the EP2P network is received. If the EP2P discovery response includes one or more new IP address and port number combinations, they are determined to belong to one or more new EP2P nodes associated with the EP2P network.

20 Claims, 9 Drawing Sheets

105

106

107

METHOD AND DISCOVERY SYSTEM FOR DISCOVERING ENCRYPTED PEER-TO-PEER (EP2P) NODES ASSOCIATED WITH A PARTICULAR EP2P NETWORK

CROSS-REFERENCE TO RELATED APPLICATIONS

The present invention claims priority from U.S. Patent Application Ser. No. 61/386,059 to Materna, et al., filed on Sep. 24, 2010, from U.S. Patent Application Ser. No. 61/386,063 to Materna, et al., filed on Sep. 24, 2010, from U.S. Patent Application Ser. No. 61/386,068 to Materna, et al., filed on Sep. 24, 2010, and from U.S. Patent Application Ser. No. 61/386,074 to Materna, et al., filed on Sep. 24, 2010, which are incorporated herein by reference.

REFERENCE TO A COMPUTER PROGRAM LISTING APPENDIX

A computer program listing appendix is submitted herewith via the United States Patent Office Electronic Filing System. All of the material submitted herewith is incorporated herein by reference. The computer program listing appendix includes four files. The names, dates of creation, and sizes in bytes of the files are as follows: 1) rc4_gen_c.txt, Sep. 22, 2011, 149,812; 2) sky_rc4seeder_c.txt, Sep. 22, 2011, 649,212; 3) sky_rc4seeder_h.txt, Sep. 22, 2011, 134,364; and 4) sky_types_h.txt, Sep. 22, 2011, 160,241.

File 1) is the source code of the demonstration program, in .txt format. The program demonstrates the usage of Skype compatible key generation. The input attributes are a seed in the form of a 32-byte hexadecimal integer (0xaabbccddee) and an optional file containing a salt (80 bytes). The output is a key that could be used for RC4 initialization. File 2) is the source code of the Skype compatible implementation of the seed based key generation function, also referred to herein as the key function, in .txt format. File 3) is the source code of the header file defining key generation function prototype, in .txt format. File 4) is the source code of the header file defining types used by the key generation function, in .txt format.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

The present invention relates to methods and discovery systems for discovering encrypted peer-to-peer (EP2P) nodes. More particularly, the present invention relates to methods and discovery systems for discovering EP2P nodes associated with a particular EP2P network.

BACKGROUND OF THE INVENTION

The explosive growth in the popularity of peer-to-peer (P2P) networks has created virtual communities of millions of people who communicate through the use of instant messaging, file transfer, as well as voice and video communications.

P2P networks include P2P nodes that are, generally, peers. Peers make a portion of their resources, such as processing power, disk storage, or network bandwidth, directly available to other peers. In a pure P2P network, there is no need for central coordination, for example, by a central server. Peers act as both suppliers of resources, or servers, and as consumers of resources, or clients. P2P nodes may be dynamically added or removed from P2P networks, and connections between P2P nodes are largely ad hoc. P2P networks are generally implemented as application-layer overlay networks over the physical-layer internet protocol (IP) network. Overlay networks allow indexing and peer discovery, while content is, typically, exchanged directly over the underlying IP network.

For added security, many P2P networks use encryption, and such networks are referred to as encrypted peer-to-peer (EP2P) networks. For example, the EP2P sessions carried on EP2P networks may be encrypted by randomizing portions of EP2P packets. Often the EP2P sessions carried on EP2P networks are also obfuscated, for example, by inserting padding into EP2P packets. Therefore, EP2P networks pose substantial challenges to organizations tasked with detecting, intercepting, mapping, and blocking unauthorized communications, such as governments, corporate enterprises, intelligence organizations, lawful intercept entities, and censorship organizations.

With reference to FIG. 1A, a typical EP2P network 100 includes a plurality of EP2P nodes 101, 102, and 103 that are, generally, peers. Typically, the nodes 101, 102, and 103 include directory nodes 101, relay nodes 102, and general nodes 103. In some instances, the EP2P network 100 also includes a certificate authority or key server 104, which provides user authentication services. The directory nodes 101, which have listings of EP2P nodes 101, 102, and 102, route the EP2P sessions carried on the EP2P network 100, and the relay nodes 102 relay the EP2P sessions between the general nodes 103.

The EP2P sessions carried on the EP2P network 100 include EP2P packets having the same source IP address and port number combination, destination IP address and port number combination, and transport protocol. An exemplary user datagram protocol (UDP) EP2P packet 105 and an exemplary transmission control protocol (TCP) EP2P packet 106 are illustrated in FIG. 1B. In some instances, a TCP key exchange packet 107 is used in conjunction with the TCP EP2P packet 106.

It is, generally, difficult to discover EP2P nodes associated with EP2P networks and, therefore, to map EP2P networks. EP2P networks do not provide a static association between the IP address and port number combination of a client and the unique client identifier (ID). Users of EP2P networks are highly mobile and may use clients from various geographically dispersed locations, such as their homes, workplaces, or hotels. The resulting changes in IP address and port number complicate the discovery of EP2P nodes.

Several solutions have been proposed for discovering P2P nodes. However, these solutions may not be readily applicable to the discovery of EP2P nodes associated with a particular EP2P network. As described in U.S. Patent Application Publication No. 2010/0064362 to Materna, et al., published on Mar. 11, 2010, which is incorporated herein by reference, P2P voice over internet protocol (VoIP) nodes may be discovered by scanning VoIP-specific ports of IP addresses and by detecting a VoIP service at the IP addresses. As described in U.S. Patent Application Publication No. 2009/0299937 to Lazovsky et al., published on Dec. 3, 2009, which is incorporated herein by reference, P2P nodes may be discovered by searching for a file ID in their shared storage. As described in U.S. Pat. No. 7,958,250 to Sridhar, et al., issued on Jun. 7, 2011, which is incorporated herein by reference, P2P nodes may be discovered by analyzing connection configuration data for a known P2P node.

SUMMARY OF THE INVENTION

Accordingly, the present invention relates to methods and discovery systems for discovering encrypted peer-to-peer (EP2P) nodes associated with a particular EP2P network.

One aspect of the present invention relates to a discovery system for discovering EP2P nodes associated with a particular EP2P network, embodied in one or more non-transitory computer-readable storage media and executable by one or more processors, comprising: one or more discovery agents, each discovery agent including: a port scanner module for receiving one or more initial IP addresses, each having a plurality of port numbers, for sending an EP2P connection request associated with the particular EP2P network to each initial IP address and port number combination, for if a response is received from a particular initial IP address and port number combination, determining whether the response is an EP2P connection response associated with the particular EP2P network, and for if the response is determined to be an EP2P connection response associated with the particular network, determining that the particular initial IP address and port number combination belongs to an initial EP2P node associated with the particular EP2P network, having an active status; and a node discovery module for receiving the particular initial IP address and port number combination from the port scanner module, for sending an EP2P discovery request associated with the particular EP2P network to the particular initial IP address and port number combination, for receiving an EP2P discovery response associated with the particular EP2P network from the initial IP address and port number combination, for determining whether the EP2P discovery response includes one or more new IP address and port number combinations, and for if the EP2P discovery response includes one or more new IP address and port number combinations, extracting the one or more new IP address and port number combinations from the EP2P discovery response and determining that the one or more new IP address and port number combinations belong to one or more new EP2P nodes associated with the particular EP2P network, each having an unknown status and each having a relationship to the initial EP2P node.

Another aspect of the present invention relates to method of discovering EP2P nodes associated with a particular EP2P network, executed by one or more processors, comprising: 1) receiving one or more initial IP addresses, each having a plurality of port numbers; 2) sending an EP2P connection request associated with the particular EP2P network to each initial IP address and port number combination; 3) if a response is received from a particular initial IP address and port number combination, determining whether the response is an EP2P connection response associated with the particular EP2P network; 4) if the response is determined to be an EP2P connection response associated with the particular network, determining that the particular initial IP address and port number combination belongs to an initial EP2P node associated with the particular EP2P network, having an active status; 5) sending an EP2P discovery request associated with the particular EP2P network to the particular initial IP address and port number combination; 6) receiving an EP2P discovery response associated with the particular EP2P network from the particular initial IP address and port number combination; 7) determining whether the EP2P discovery response includes one or more new IP address and port number combinations; and 8) if the EP2P discovery response includes one or more new IP address and port number combinations, extracting the one or more new IP address and port number combinations from the EP2P discovery response and determining that the one or more new IP address and port number combinations belong to one or more new EP2P nodes associated with the particular EP2P network, each having an unknown status and each having a relationship to the initial EP2P node.

Another aspect of the present invention relates to one or more non-transitory computer-readable storage media comprising instructions that, when executed by one or more processors, perform a method of discovering EP2P nodes associated with a particular EP2P network, the method comprising: 1) receiving one or more initial IP addresses, each having a plurality of port numbers; 2) sending an EP2P connection request associated with the particular EP2P network to each initial IP address and port number combination; 3) if a response is received from a particular initial IP address and port number combination, determining whether the response is an EP2P connection response associated with the particular EP2P network; 4) if the response is determined to be an EP2P connection response associated with the particular network, determining that the particular initial IP address and port number combination belongs to an initial EP2P node associated with the particular EP2P network, having an active status; 5) sending an EP2P discovery request associated with the particular EP2P network to the particular initial IP address and port number combination; 6) receiving an EP2P discovery response associated with the particular EP2P network from the particular initial IP address and port number combination; 7) determining whether the EP2P discovery response includes one or more new IP address and port number combinations; and 8) if the EP2P discovery response includes one or more new IP address and port number combinations, extracting the one or more new IP address and port number combinations from the EP2P discovery response and determining that the one or more new IP address and port number combinations belong to one or more new EP2P nodes associated with the particular EP2P network, each having an unknown status and each having a relationship to the initial EP2P node.

BRIEF DESCRIPTION OF THE DRAWINGS

The present invention will be described in greater detail with reference to the accompanying drawings wherein.

DETAILED DESCRIPTION OF THE INVENTION

The present invention provides methods and a discovery systems for discovering encrypted peer-to-peer (EP2P) nodes associated with a particular EP2P network. The methods and detection systems described herein may also be used for mapping the particular EP2P network, for discovering EP2P users associated with the particular EP2P network, and for tracking the behavior of the discovered EP2P users.

Figure 2:
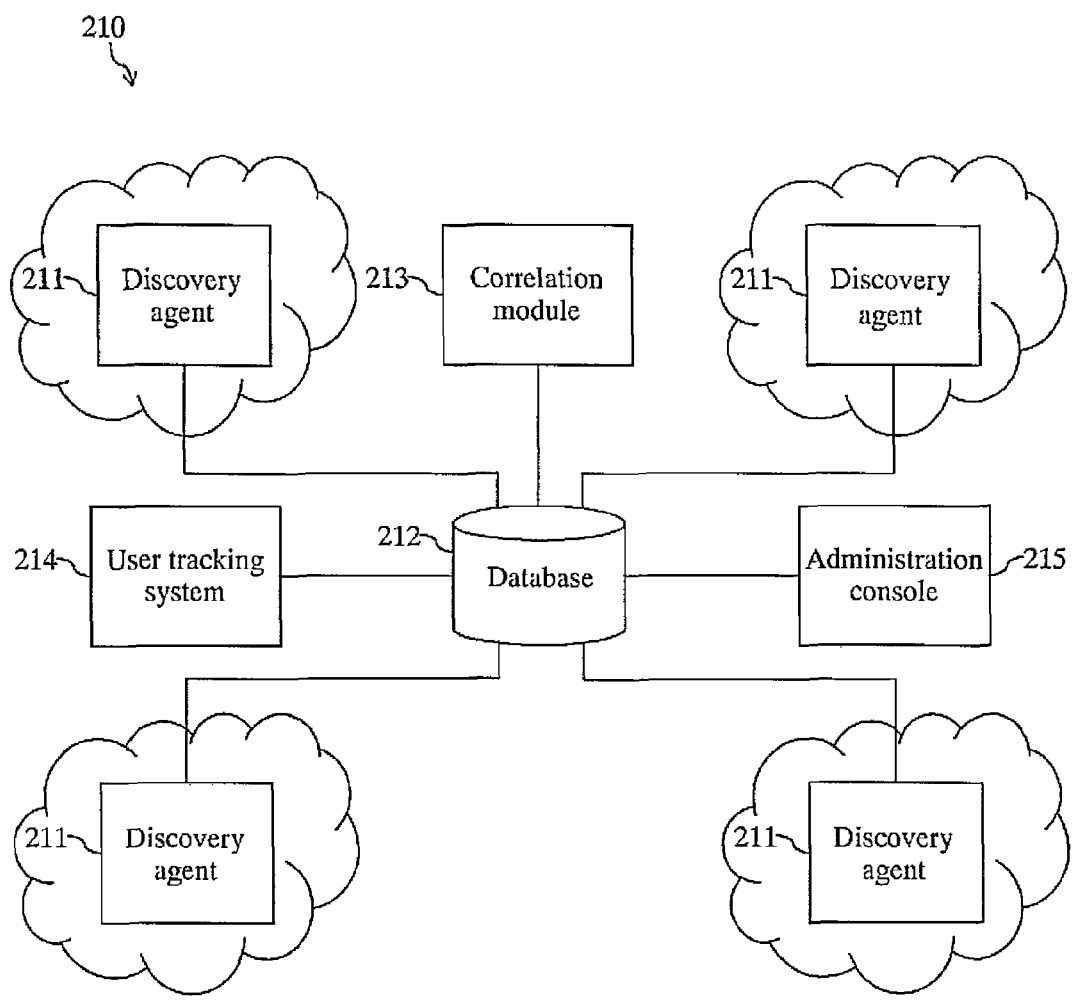
FIG. 2 is a schematic illustration of a discovery system according to the present invention.

With reference to FIG. 2, the discovery system 210 includes one or more discovery agents 211. Typically, the discovery system 210 also includes a database 212. Preferably, the discovery system 210 is a distributed discovery system 210 including a plurality of discovery agents 211, a correlation module 213, a user tracking system 214, an administration console 215, and a centralized database 212 accessible by the plurality of discovery agents 211, the correlation module 213, the user tracking system 214, and the administration console 215. Advantageously, such a distributed discovery system 210 may be scaled for use in small to very large environments.

The discovery system 210 may be implemented as hardware, software, or a combination of hardware and software. Typically, the discovery system 210 is embodied in one or more non-transitory computer-readable storage media, and the method carried out by the discovery system 210 is executed by one or more processors. That is, typically, each discovery agent 211, the database 212, the correlation module 213, the user tracking system 214, and the administration console 215 are embodied in non-transitory computer-readable storage media, and the actions carried out by each discovery agent 211, the database 212, the correlation module 213, the user tracking system 214, and the administration console 215 are executed by a processor.

The non-transitory computer-readable storage media may be any media that are able to store computer-executable instructions and that are able to be accessed by a computer including a processor. For example, the non-transitory computer-readable storage media may include a magnetic storage device, such as a hard disk, a floppy disk, or a flash memory, or an optical storage device, such as a compact disc (CD), a digital video disc (DVD), or a blu-ray disc (BD).

Preferably, the discovery system 210 is implemented as software embodied in one or more non-transitory computer readable storage media and executable by one or more processors of one or more computers dedicated to network packet processing. The computers, generally, each include a network card, a hard disk, and an operative memory, in addition to a processor in the form of a central processing unit (CPU). Preferably, separate distributed computers are used for each discovery agent 211, and a central computer is used for the database 212, the correlation module 213, the user tracking system 214, and the administration console 215. In some instances, the distributed computers used for each discovery agent 211 also include a local database.

The discovery agent 211 enables the discovery of EP2P nodes associated with a particular EP2P network and the collection of node information for the discovered EP2P nodes. Generally, each discovery agent 211 is located in a different segment of the particular EP2P network and discovers EP2P nodes located in that segment. Preferably, each discovery agent 211 discovers all the EP2P nodes in the segment of the network in which it is located, typically, while acting in parallel, so that all the EP2P nodes associated with the particular EP2P network are discovered by the discovery system 210.

Figure 3:
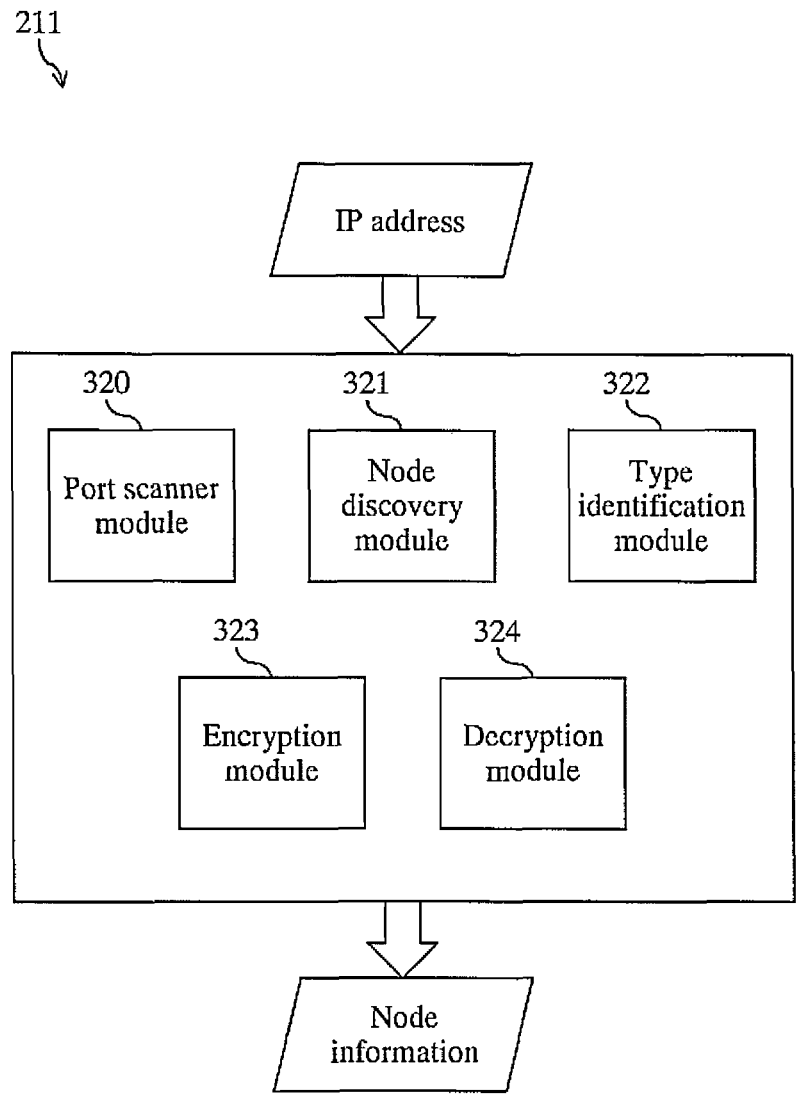
FIG. 3 is a schematic illustration of a discovery agent in the discovery system of FIG. 2.
Figure 4:
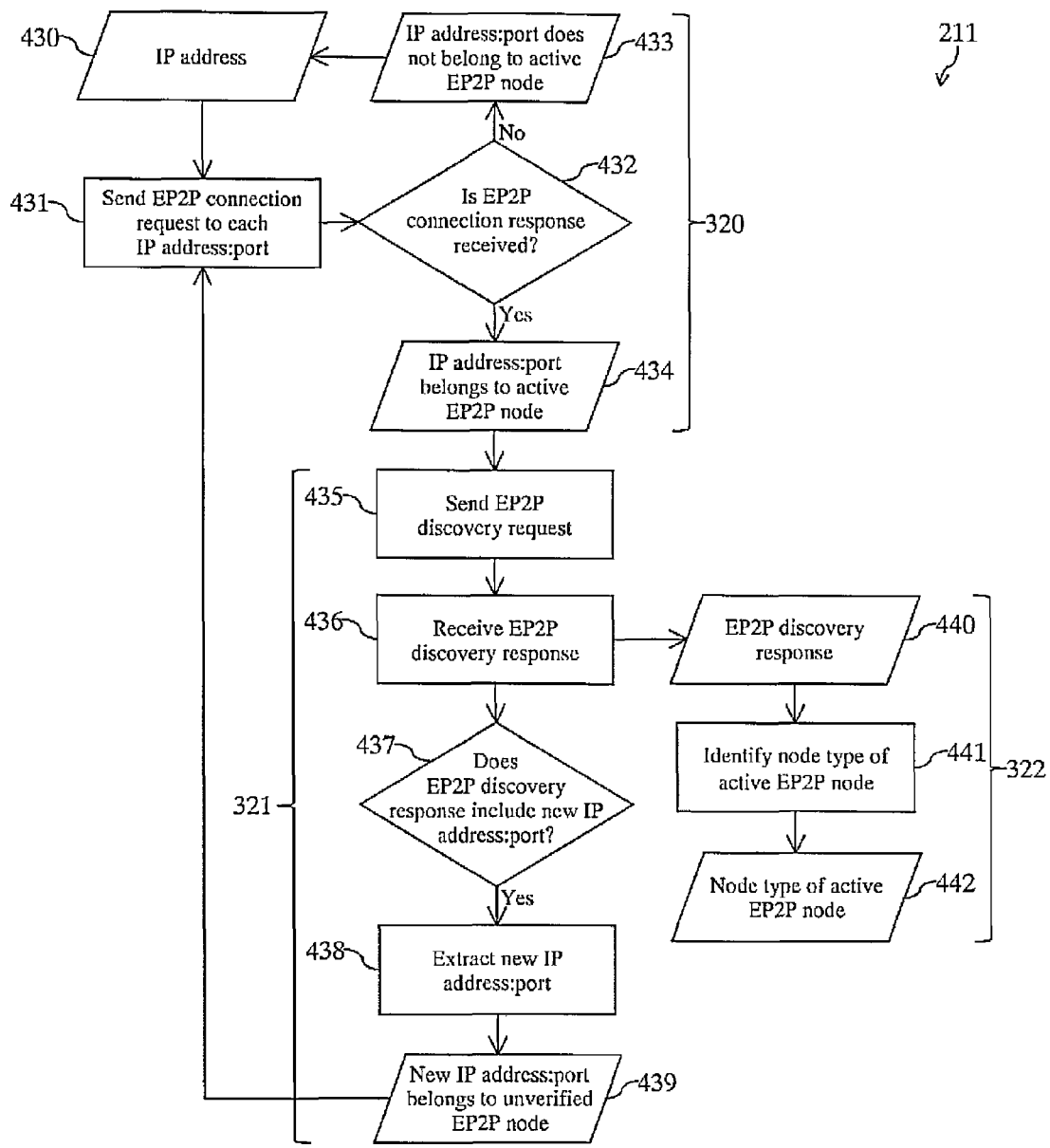
FIG. 4 is a flow diagram of the discovery agent of FIG. 3.

With reference to FIGS. 3 and 4, an exemplary embodiment of the discovery agent 211 includes a port scanner module 320, a node discovery module 321, a type identification module 322, an encryption module 323, and a decryption module 324. The modules included in each detection agent 211 may be implemented as stand-alone software modules, may be grouped into larger software modules, or may be split into smaller software modules, as desired.

In FIG. 4, the actions carried out by the port scanner module 320, the node discovery module 321, and the type identification module 322 are depicted as blocks in a flow diagram. At block 430, the port scanner module 320 receives one or more initial IP addresses, each having a plurality of port numbers. For example, a single initial IP address suspected or known to belong to an EP2P node associated with the particular EP2P network, or a predetermined range of initial IP addresses may be received. Typically, the one or more initial IP addresses are provided via the administration console 215.

At block 431, the port scanner module 320 sends an EP2P connection request associated with the particular EP2P network to each initial IP address and port number combination, in an attempt to establish an EP2P connection associated with the particular EP2P network.

Figure 5:
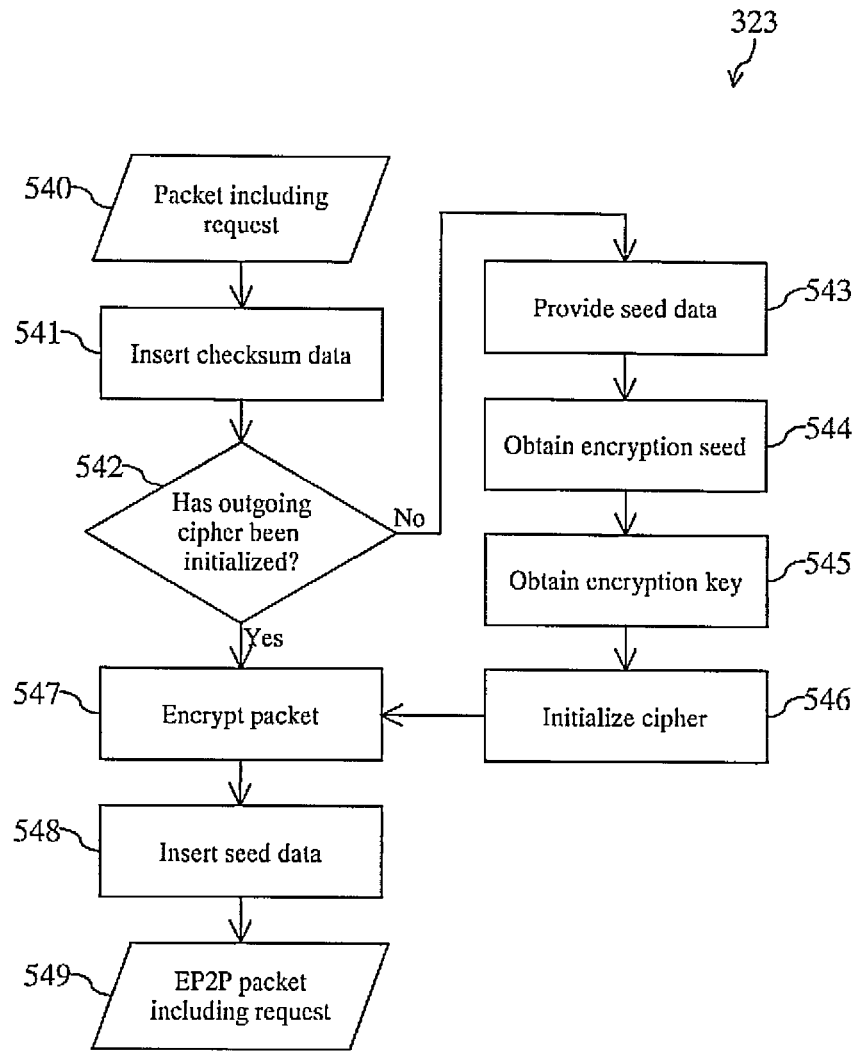
FIG. 5 is a flow diagram of an encryption module in the discovery agent of FIG. 3.

With reference to FIGS. 3 and 5, the port scanner module 320 implements the encryption module 323 to encrypt the EP2P connection request sent to each particular initial IP address and port number combination.

In FIG. 5, the actions carried out by the encryption module 323 are depicted as blocks in a flow diagram. At block 540, the encryption module 323 creates an unencrypted packet including a request associated with the particular EP2P network, in this instance, the EP2P connection request. The request is network-specific, and may include an EP2P connection request, an EP2P discovery request, an EP2P user search request, or an EP2P user data request, for example.

The encryption process applied to the packet is selected on the basis of transport protocol, as well as the particular EP2P network. At block 541, the encryption module 323 inserts checksum data associated with the particular EP2P network into the packet. The checksum data is selected such that a checksum obtained from the checksum data matches a reference checksum associated with the particular EP2P network. The checksum may be obtained directly from the extracted checksum data, or may be obtained from the extracted checksum data by using a checksum function associated with the particular EP2P network.

Figure 1A:
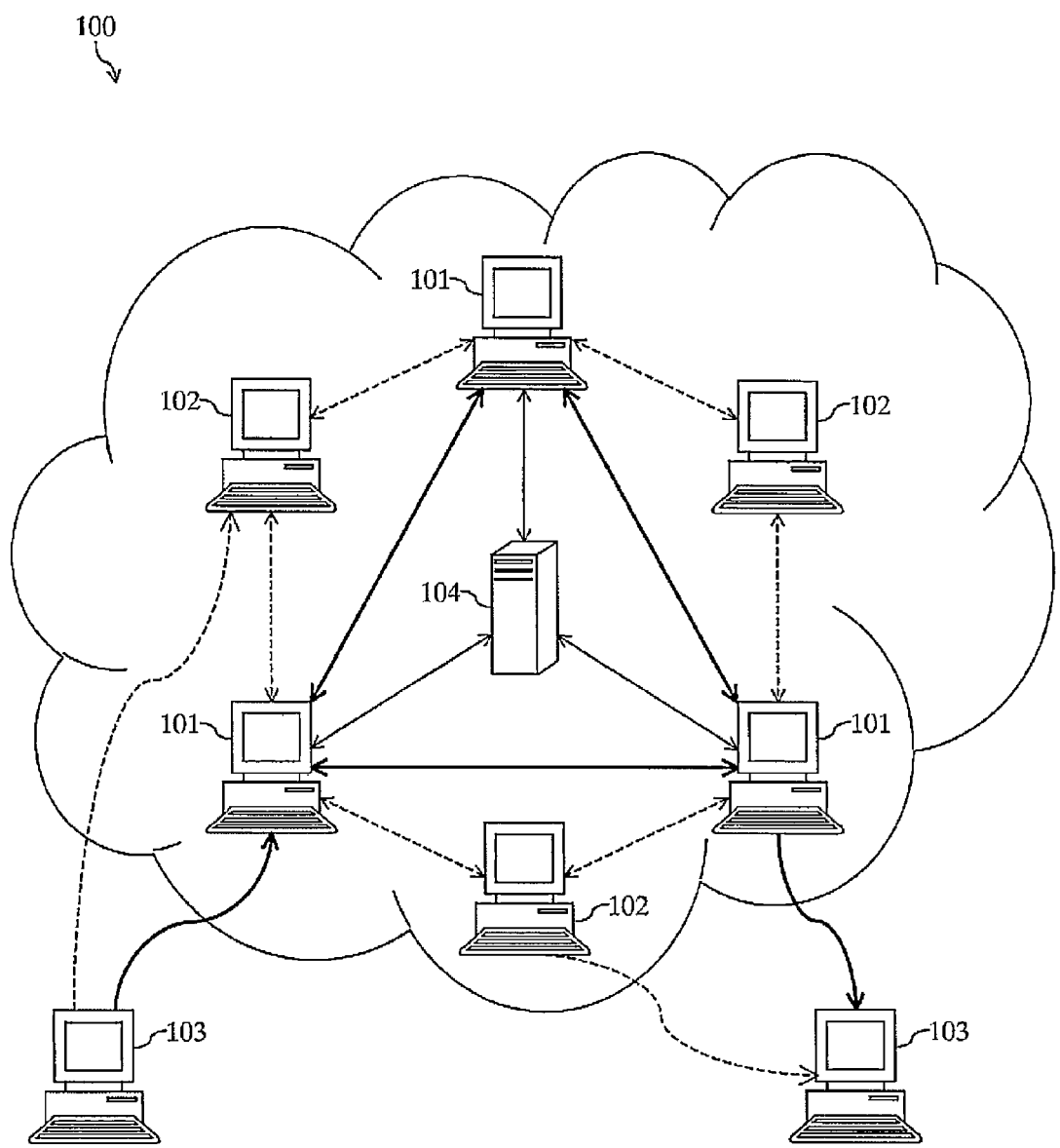
FIG. 1A is a schematic illustration of a prior-art encrypted peer-to-peer (EP2P) network.
Figure 1B:
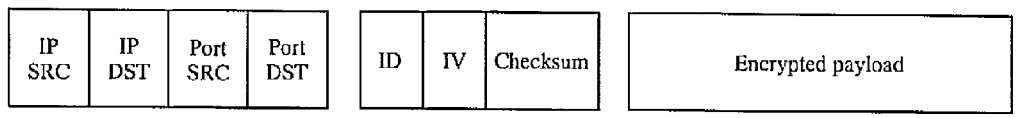
FIG. 1B is a schematic illustration of an exemplary prior-art user datagram protocol (UDP) EP2P packet, an exemplary prior-art transmission control protocol (TCP) EP2P packet, and an exemplary prior-art TCP key exchange packet.
Figure 1B:
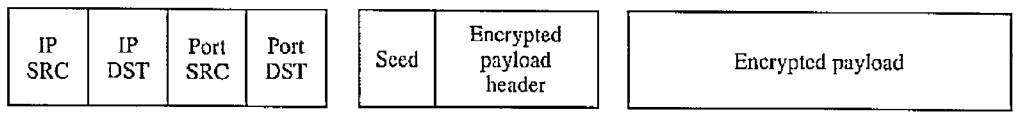
Figure 1B:
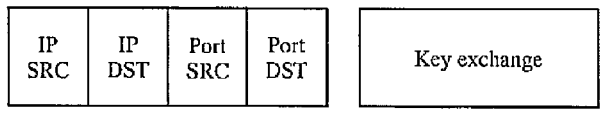

Whether a checksum function is used is network-specific and transport-protocol-specific. The checksum data, the checksum function, when used, and the reference checksum are also network-specific and transport-protocol-specific. For example, when the packet is a user datagram protocol (UDP) packet, such as the exemplary UDP EP2P packet 105 of FIG. 1B, the checksum data may consist of all the data in the packet payload that will be encrypted, the checksum may be obtained by applying the crc32 hash function, as the checksum function, to the checksum data, and the reference checksum may consist of data of a particular byte length, inserted at a particular position in the packet payload. For another example, when the packet is a transmission control protocol (TCP) packet, such as the exemplary TCP EP2P packet 106 of FIG. 1B, the checksum data may consist of data of a particular byte length, inserted at a particular position in the payload header that will be encrypted, the checksum may be obtained by simply using the checksum data as the checksum, and the reference checksum may be a hardcoded checksum not included in the packet.

At block 542, the encryption module 323 determines whether an outgoing cipher associated with the particular EP2P has already been initialized for the same destination IP address and port number combination. If so, blocks 543 to 546 may be skipped. If not, at block 543, the encryption module 323 provides seed data associated with the particular EP2P network. At block 544, the encryption module 323 obtains an encryption seed from the provided seed data. The encryption seed may be obtained directly from the seed data, or may be obtained from the seed data by using a seed function associated with the particular EP2P network.

Whether a seed function is used is network-specific and transport-protocol-specific. The seed data and the seed function, when used, also network-specific and transport-protocol-specific. For example, when the packet is a UDP packet, such as the exemplary UDP EP2P packet 105 of FIG. 1B, the seed data may consist of the source IP address, the source port, the destination IP address, the destination port, the packet identifier (ID), and the initialization vector of the packet, and the seed function may be obtained by performing one or more arithmetic operations on the seed data. For another example, when the packet is a TCP packet, such as the exemplary TCP EP2P packet 106 of FIG. 1B, the seed data may consist of data of a particular byte length, inserted at a particular position in the packet payload, and the encryption seed may be obtained by simply using the seed data as the encryption seed.

At block 545, the encryption module 323 obtains an encryption key from the encryption seed by using a key function associated with the particular EP2P network. The key function is network-specific and may also be transport-protocol-specific. In general, a key function associated with a particular EP2P application may be obtained by the following process. The key function is first identified in the client software associated with the particular EP2P application. The key function is then called and a first input value is provided. The key function may be called by simply connecting to the client software, or by sending specially constructed packets to the client software. A first output value of the key function is obtained for the first input value and is recorded together with the first input value, for instance, in a database. The steps of providing an input value and obtaining an output value are repeated for a large number of input values, i.e., for substantially all possible input values. A function is then constructed that reproduces the obtained output values for the provided input values, which may be used as the key function. An exemplary key function associated with a particular EP2P application is provided in the computer program listing appendix submitted herewith.

At block 546, the encryption module 323 initializes an outgoing cipher associated with the particular EP2P network by using the obtained encryption key. The outgoing cipher is network-specific, and may, for example, consist of a stream cipher, such as the RC4 cipher.

Once the outgoing cipher has been initialized, the encryption module 323 uses the initialized outgoing cipher to encrypt the packet, at block 547. For example, when the packet is a UDP packet, such as the exemplary UDP EP2P packet 105 of FIG. 1B, the packet payload may be encrypted. For another example, when the packet is a TCP packet, such as the exemplary TCP EP2P packet 106 of FIG. 1B, the packet payload, including the payload header, may be encrypted.

At block 548, the encryption module 323 inserts the seed data into the packet. Optionally, the encryption module 323 may also insert obfuscated portions into the packet, specifically, into the packet payload. At block 549, an EP2P packet associated with the particular EP2P network including an encrypted request is obtained as a result of the encryption process. In this instance, the EP2P packet includes the EP2P connection request, which is encrypted so as to allow successful decryption by an EP2P node associated with the particular EP2P network.

With reference to FIGS. 3 and 4, after sending the EP2P connection request to a particular initial IP address and port number combination, the port scanner module 320 waits for a timeout period to receive a response. If a response is not received during the timeout period, the port scanner module 320 determines that an EP2P connection response associated with the particular EP2P network has not been received, at block 432. Moreover, the port scanner module 320 determines that the particular initial IP address and port number combination does not belong to an active EP2P node associated with the particular EP2P network. The port scanner module 320 then proceeds to another initial IP address and port number combination, at block 430.

At block 432, if a response is received from the particular IP address and port number combination, the port scanner module 320 determines whether the response is an EP2P connection response associated with the particular EP2P network, that is, whether an EP2P connection associated with the particular EP2P network has been established.

Figure 6:
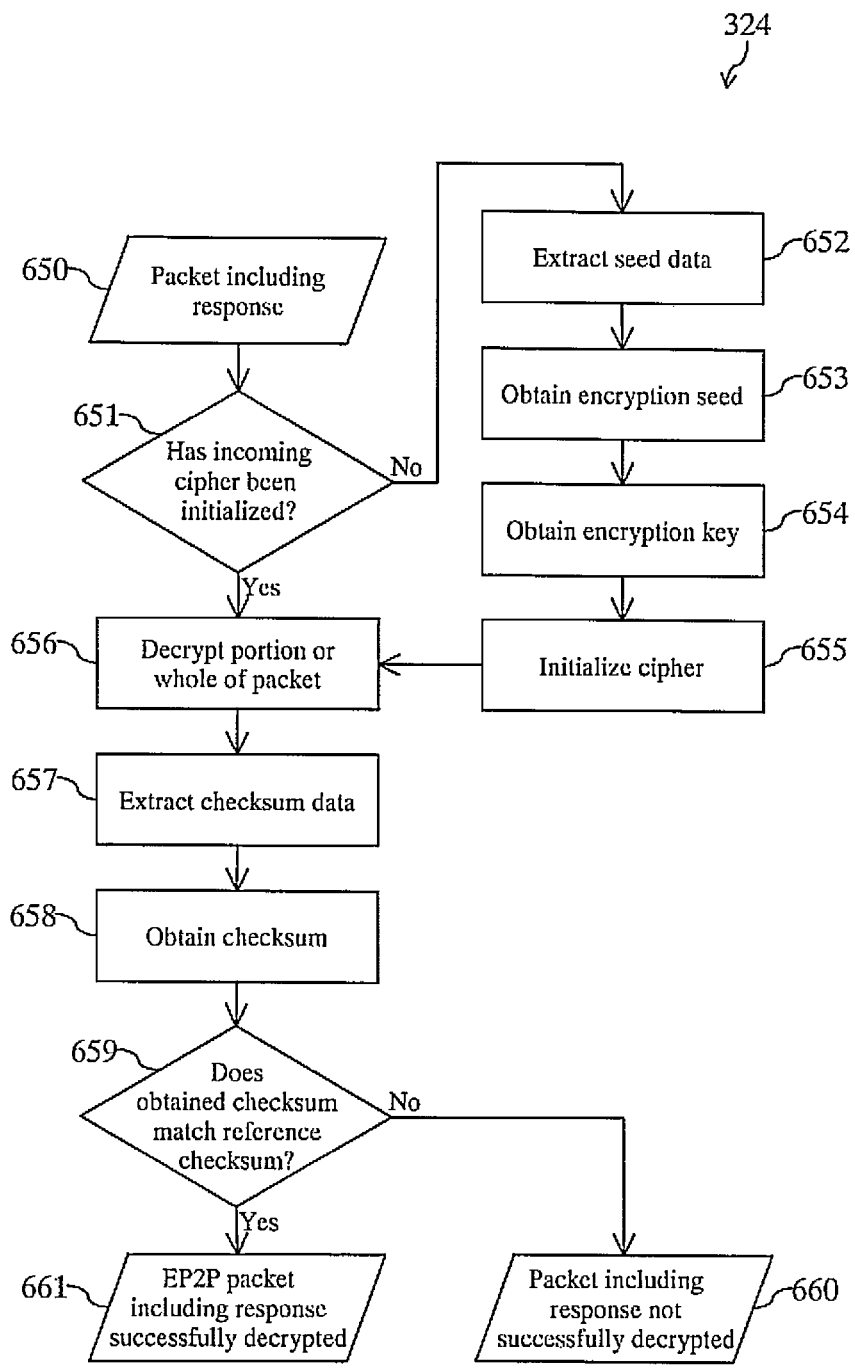
FIG. 6 is a flow diagram of a decryption module in the discovery agent of FIG. 3.

With reference to FIGS. 3 and 6, the port scanner module 320 implements the decryption module 324 to attempt to decrypt the response received from the particular IP address and port number combination.

In FIG. 6, the actions carried out by the decryption module 324 are depicted as blocks in a flow diagram. At block 650, the decryption module 324 receives a packet including a response; in this instance, the response is of an unknown type. In other instances, the response is a network-specific response associated with the particular EP2P network. For example, the response may include an EP2P connection response, an EP2P discovery response, an EP2P user search response, or an EP2P user data response.

The decryption process applied to the packet is selected on the basis of transport protocol, as well as the particular EP2P network. Optionally, the decryption module 324 may remove any obfuscated portions from the packet, specifically, from the packet payload. At block 651, the decryption module 324 determines whether an incoming cipher associated with the particular EP2P has been already initialized for a response received from the same source IP address and port number combination. If so, blocks 652 to 655 may be skipped. If not, at block 652, the decryption module 324 extracts seed data associated with the particular EP2P network from the packet. At block 653, the decryption module 324 obtains an encryption seed from the extracted seed data. The encryption seed may be obtained directly from the seed data, or may be obtained from the seed data by using a seed function associated with the particular EP2P network.

Whether a seed function is used is network-specific and transport-protocol-specific. The seed data and the seed function, when used, also network-specific and transport-protocol-specific. For example, when the packet is a UDP packet, such as the exemplary UDP EP2P packet 105 of FIG. 1B, the seed data may consist of the source IP address, the source port, the destination IP address, the destination port, the packet identifier (ID), and the initialization vector of the packet, and the seed function may be obtained by performing one or more arithmetic operations on the seed data. For another example, when the packet is a TCP packet, such as the exemplary TCP EP2P packet 106 of FIG. 1B, the seed data may consist of data of a particular byte length, extracted from a particular position in the packet payload, and the encryption seed may be obtained by simply using the seed data as the encryption seed.

At block 654, the decryption module 324 obtains an encryption key from the encryption seed by using a key function associated with the particular EP2P network. The key function is network-specific and may also be transport-protocol-specific. A process for obtaining a key function is described heretofore. An exemplary key function associated with a particular EP2P application is provided in the computer program listing appendix submitted herewith.

At block 655, the decryption module 324 initializes an incoming cipher associated with the particular EP2P network by using the obtained encryption key. The initialized incoming cipher may be the same as or different from the initialized outgoing cipher. The incoming cipher, like the outgoing cipher, is network-specific, and may, for example, consist of a stream cipher, such as the RC4 cipher.

Once the incoming cipher has been initialized, the decryption module 324 uses the initialized incoming cipher to decrypt a portion or whole of the packet, including the response, at block 656. For example, when the packet is a UDP packet, such as the exemplary UDP EP2P packet 105 of FIG. 1B, the whole packet may be decrypted. For another example, when the packet is a TCP packet, such as the exemplary TCP EP2P packet 106 of FIG. 1B, only the encrypted payload header may be decrypted for verification of the decryption, but the whole packet may be decrypted for analysis of the response.

At block 657, the decryption module 324 extracts checksum data associated with the particular EP2P network from the decrypted portion or whole of the packet. At block 658, the decryption module 324 obtains a checksum from the extracted checksum. The checksum may be obtained directly from the extracted checksum data, or may be obtained from the extracted checksum data by using a checksum function associated with the particular EP2P network. At block 659, the decryption module 324 compares the obtained checksum to a reference checksum associated with the particular EP2P network.

Whether a checksum function is used is network-specific and transport-protocol-specific. The checksum data, the checksum function, when used, and the reference checksum are also network-specific and transport-protocol-specific. For example, when the packet is a user datagram protocol (UDP) packet, such as the exemplary UDP EP2P packet 105 of FIG. 1B, the checksum data may consist of all the data in the decrypted packet payload, the checksum may be obtained by applying the crc32 hash function to the checksum data, and the reference checksum may consist of data of a particular byte length, extracted from a particular position in the packet payload. For another example, when the packet is a transmission control protocol (TCP) packet, such as the exemplary TCP EP2P packet 106 of FIG. 1B, the checksum data may consist data of a particular byte length, extracted from a particular position in the decrypted payload header, the checksum may be obtained by simply using the checksum data as the checksum, and the reference checksum may be a hardcoded checksum not included in the packet.

If the obtained checksum does not match the reference checksum, the decryption module 324 determines that the portion or whole of the packet including the response has not been successfully decrypted, at block 660. In other words, the response has not been successfully decrypted. Optionally, when the particular packet is a TCP packet, such as the exemplary TCP EP2P packet 106 of FIG. 1B, used in conjunction with a key exchange packet, such as the exemplary TCP key exchange packet 107 of FIG. 1B, another decryption attempt may be made by implementing a man-in-the-middle (MITM) attack. A MITM attack may be performed to intercept an encryption salt, and a new encryption key obtained from the intercepted encryption salt and the obtained encryption seed by using the key function. The incoming cipher may then be reinitialized by using the new encryption key, and the portion or whole of the particular packet decrypted by using the reinitialized cipher.

On the other hand, if the obtained checksum matches the reference checksum, the decryption module 324 determines that the portion or whole of the packet including the response has been successfully decrypted, at block 661. In other words, the response has been successfully decrypted.

With reference to FIGS. 3 and 4, if the response is not successfully decrypted by the decryption module 324, the port scanner module 320 determines that the response is not an EP2P connection response associated with the particular EP2P network, at block 432. Moreover, the port scanner module 320 determines that the particular initial IP address and port number combination does not belong to an active EP2P node associated with the particular EP2P network, at block 433. The port scanner module 320 then proceeds to another initial IP address and port number combination, at block 430.

On the other hand, if the response is successfully decrypted by the decryption module 324, the port scanner module 320 determines that the response is an EP2P connection response associated with the particular EP2P network, at block 432. Moreover, the port scanner module 320 determines that the particular initial IP address and port number combination belongs to an initial EP2P node associated with the particular EP2P network, having an active status, at block 434. The port scanner module 320 stores the particular IP address and port number combination and the active status of the initial EP2P node in the database 212. Preferably, the port scanner module 320 also stores additional node information for the initial EP2P node in the database 212, for example, a transport protocol or a verified timestamp. The port scanner module 320 then forwards the particular initial IP address and port number combination to the node discovery module 321.

Typically, the port scanner module 320 scans all the port numbers of each initial IP address sequentially for EP2P connections associated with the particular EP2P network. The port scanner module 320 may proceed through all the initial IP address and port number combinations or, for increased efficiency, may stop after a single initial IP address and port number combination is found that belongs to an active EP2P node associated with the particular EP2P network. Preferably, for even greater efficiency, the port scanner module 320 performs a port scan for open ports before performing the port scan for EP2P connections. It should be noted that if an IP address and port number combination belonging to an active EP2P node associated with the particular network is already known, the port scan for EP2P connections may be skipped.

Accordingly, the node discovery module 321 receives the particular initial IP address and port number combination from the port scanner module 320. At block 435, the node discovery module 321 sends an EP2P discovery request associated with the particular EP2P network to the particular initial IP address and port number combination. In some instances, the node discovery module 321 sends a set of EP2P discovery requests associated with the particular EP2P network.

With reference to FIGS. 3 and 5, the port scanner module 320 implements the encryption module 323 to encrypt the EP2P discovery request sent to the particular initial IP address and port number combination. The encryption module 323 carries out the same actions described heretofore. As the outgoing cipher has already been initialized for the particular initial IP address and port number combination, the encryption module 323 skips blocks 543 to 546. In this instance, the resulting EP2P packet associated with the particular EP2P network includes the EP2P discovery request.

With reference to FIGS. 3 and 4, at block 436, the node discovery module 321 receives an EP2P discovery response associated with the particular EP2P network from the particular initial IP address and port number combination.

With reference to FIGS. 3 and 6, the node discovery module 321 implements the decryption module 324 to decrypt the EP2P discovery response received from the particular initial IP address and port number combination. The decryption module 324 carries out the same actions described heretofore. As the incoming cipher has already been initialized for the particular initial IP address and port number combination, the decryption module 324 skips blocks 652 to 655. In this instance, the packet including the response is assumed to be an EP2P packet associated with the particular EP2P network including the EP2P discovery response, and the whole packet is decrypted. A checksum comparison may still be performed, at block 659, to verify that the packet including the response has been successfully decrypted, if desired.

With reference to FIGS. 3 and 4, the node discovery module 321 analyzes the decrypted EP2P discovery response to determine whether the EP2P discovery response includes one or more new IP address and port number combinations, at block 437. If the EP2P discovery response does include one or more new IP address and port number combinations, the node discovery module 321 extracts the one or more new IP address and port number combinations from the EP2P discovery response, at block 438. Moreover, the node discovery module 321 determines that the one or more new IP address and port number combinations belong to one or more new EP2P nodes associated with the particular EP2P network, each having an unknown, i.e., unverified, status and each having a relationship to the initial EP2P node, at block 439.

For example, the EP2P discovery response received from an active EP2P directory node associated with the particular EP2P network may report other EP2P directory nodes associated with the particular EP2P network. The following is an exemplary EP2P discovery response associated with a particular EP2P network, from which five new IP address and port number combinations, in hexadecimal format, belonging to five new unverified EP2P directory nodes may be extracted:

COMMAND 8:
(OBJLIST, 06):
(DWORD, 00): 00000510
(ADDR, 03): 84EF945F: 15E3
(ADDR, 03): 3E398228: 5277
(ADDR, 03): 54786C8B: 3F40
(ADDR, 03): D33479C5: 5CD7
(ADDR, 03): 4F7FF45A: 04B1
(DWORD, 07): 00000010

The node discovery module 321 stores the one or more new IP address and port number combinations of the one or more new EP2P nodes, the unknown status of each new EP2P node, and the relationship of each new EP2P node to the initial EP2P node in the database 212. Preferably, the node discovery module 321 also stores additional node information for each of the one or more EP2P nodes in the database 212, for example, a transport protocol or a discovered timestamp. The node discovery module 321 then forwards the one or more new IP address and port number combinations to the port scanner module 320. The node discovery module 321 also forwards the EP2P discovery response to the type identification module 322

Accordingly, the type identification module 322 receives the EP2P discovery response from the node discovery module 321, at block 440. At block 441, the type identification module 322 analyzes the EP2P discovery response to identify a type of the initial EP2P node. In other words, the type identification module 322 classifies the initial EP2P node as a particular type of node, for example, as a directory node, a relay node, or a general node. In general, different types of EP2P discovery responses are received from different types of nodes. For example, an EP2P discovery response received from an active EP2P directory node, typically, includes a plurality of IP address and port number combinations belonging to EP2P nodes, whereas an EP2P discovery response received from an active EP2P relay node does not, typically, include any IP address and port number combinations belonging to EP2P nodes. At block 442, the type identification module 322 stores the type of the initial EP2P node in the database 212.

Accordingly, the port scanner module 320 receives the one or more new IP address and port number combinations from the node discovery module 321, at block 431, and the node discovery process is repeated. Advantageously, using IP address and port number combinations of discovered EP2P nodes to discover additional EP2P nodes greatly reduces the time and resources spent on node discovery.

The actions subsequently performed by the port scanner module 320, the encryption module 323, the decryption module 324, the node discovery module 321, and the type identification module 322 are, essentially, the same as described heretofore. At block 431, the port scanner module 320 sends an EP2P connection request associated with the particular EP2P network, which has been encrypted by the encryption module 323, to each new IP address and port number combination. At block 432, if a response is received from a particular new IP address and port number combination, the port scanner module 320 determines whether the response is an EP2P connection response associated with the particular EP2P network, on the basis of whether the response is successfully decrypted by the decryption module 324.

If the response is determined to not be an EP2P connection response associated with the particular EP2P network, the port scanner module 320 determines that a particular new EP2P node to which the particular new IP address and port number combination belongs has an inactive status, at block 433. In other words, the status of the particular new EP2P node has been verified as inactive. The port scanner module 320 updates the database 212 with the inactive status of the particular new EP2P node and, preferably, with a verified timestamp. The port scanner module 320 then proceeds to another new IP address and port number combination, if available.

On the other hand, if the response is determined to be an EP2P connection response associated with the particular EP2P network, the port scanner module 320 determines that a particular new EP2P node to which the particular new IP address and port number combination belongs has an active status, at block 434. In other words, the status of the particular new EP2P node has been verified as active. The port scanner module 320 updates the database 212 with the active status of the particular new EP2P node and, preferably, with a verified timestamp. The port scanner module 320 then forwards the particular new IP address and port number combination to the node discovery module 321.

At block 435, the node discovery module 321 sends an EP2P discovery request associated with the particular EP2P network, which has been encrypted by the encryption module 323, to the particular new IP address and port number combination. At block 436, the node discovery module 321 receives an EP2P discovery response associated with the particular EP2P network, which has been decrypted by the decryption module 324, from the particular new IP address and port number combination. At block 437, the node discovery module 321 determines whether the EP2P discovery response includes one or more additional IP address and port number combinations. If the EP2P discovery response does include one or more additional IP address and port number combinations, the node discovery module 321 extracts the one or more additional IP address and port number combinations from the EP2P discovery response, at block 438, and determines that the one or more additional IP address and port number combinations belong to one or more additional EP2P nodes associated with the particular EP2P network, each having an unknown status, at block 439. The node discovery module 321 stores the one or more additional IP address and port number combinations of the one or more additional EP2P nodes, the unknown status of each additional EP2P node, and the relationship of each additional EP2P node to the particular new EP2P node in the database 212. The node discovery module 321 then forwards the one or more additional IP address and port number combinations to the port scanner module 320 and forwards the EP2P discovery response to the type identification module 322.

At block 440, the type identification module 322 receives the EP2P discovery response. The type identification module 322 analyzes the EP2P discovery response to identify a type of the particular new EP2P node, at block 441, and stores the type of the particular new EP2P node in the database 212, at block 442.

The node discovery process repeats in this fashion until as many EP2P nodes associated with the particular EP2P network as desired are discovered. Preferably, the node discovery process repeats until all the EP2P nodes in the particular EP2P network are discovered. It should be noted that the discovery agent 211 is not necessarily limited to discovering EP2P nodes associated with only one particular EP2P network, but could also be configured for discovering EP2P nodes associated with more than one particular EP2P network. For example, the actions carried out by the appropriate units of the discovery agent 211 may be repeated for a second particular EP2P network, and so on.

With reference to FIG. 2, as mentioned heretofore, node information for the discovered EP2P nodes is stored in the database 212. The node information for each discovered EP2P node includes an IP address and port number combination, a status, a relationship, and a type. The status of a discovered EP2P may include an active status, an inactive status, or an unknown status, and the type of a discovered EP2P node may include a general type, a relay type, or a directory type. One or more relationships of a discovered EP2P to other discovered EP2P nodes may be stored.

Figure 7:
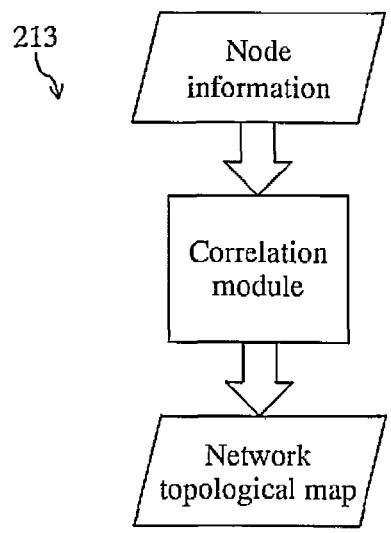
FIG. 7 is a schematic illustration of a correlation module in the discovery system of FIG. 2.

With reference to FIGS. 2 and 7, the correlation module 213 enables the mapping of the node information collected and stored in the database 212 by each discovery agent 211, specifically, by the port scanner module 320, the node discovery module 321, and the type identification module 322. In some instances, the correlation module 213 or parts thereof may be included in the discovery agent 211.

The correlation module 213 retrieves some or all of the node information from the database 212 and builds a network topological map of the particular EP2P network with the retrieved node information. For example, the correlation module 213 may build a network topological map of a segment of the particular EP2P network or of the whole particular EP2P network. The network topological map describes the relationships of the discovered EP2P nodes to one another, i.e., the connectivity of the discovered EP2P nodes. The network topological map may also indicate the IP address and port number combinations, the statuses, and/or the types of the discovered EP2P nodes.

Figure 8:
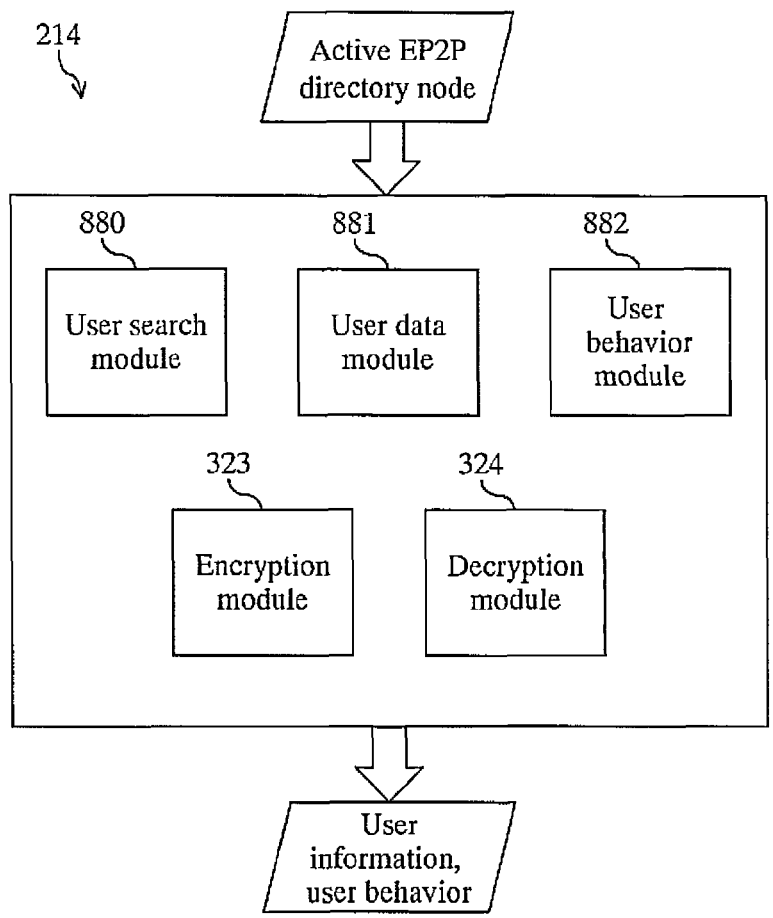
FIG. 8 is a schematic illustration of a user tracking system in the discovery system of FIG. 2.
Figure 9:
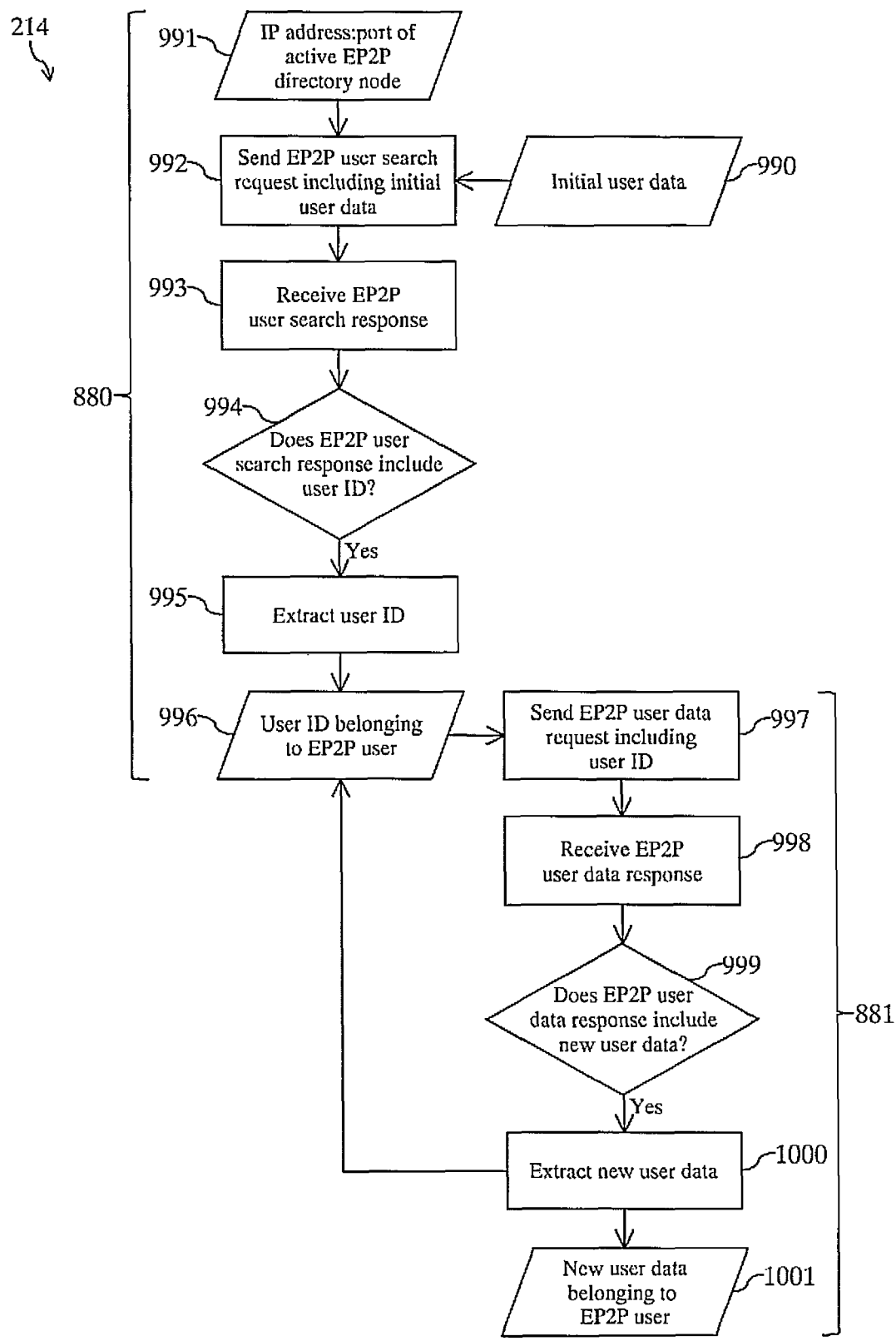
FIG. 9 is a flow diagram of the user tracking system of FIG. 8.

With reference to FIGS. 2, 8, and 9, the user tracking system 214 enables the discovery of EP2P users associated with the particular EP2P network, the collection of user information for the discovered EP2P users, and the analysis of the behavior of the discovered EP2P users. An exemplary embodiment of the user tracking system 214 includes a user search module 880, a user data module 881, a user behavior module 882, an encryption module 323, and a decryption module 324. The modules included in the user tracking system 214 may be implemented as stand-alone software modules, may be grouped into larger software modules, or may be split into smaller software modules, as desired. In some instances, the user tracking system 214 or modules thereof may be included in the discovery agent 211.

In various embodiments, the user data module 881 may be a public IP address and port number combination discovery module, a private IP address and port number combination discovery module, a hardware identification module, a software identification module, or a combination thereof. Moreover, the user tracking system 214 may include one or more user data modules 881.

In FIG. 9, the actions carried out by the user search module 880 and the user data module 881 are depicted as blocks in a flow diagram. At block 990, the user search module 880 receives initial user data. For example, the initial user data may include a real name, a user name, an age, a country, a language, an email address, a client ID, a public IP address and port number combination, a private IP address and port number combination, a geographical location, hardware information, software information, or a combination thereof. Typically, the initial user data is provided via the administration console 215.

At block 991, the user search module 880 retrieves an IP address and port number combination of a discovered EP2P node having an active status and a directory type, i.e., an active EP2P directory node, from the database 212. At block 992, the user search module 880 sends an EP2P user search request associated with the particular EP2P network, including the initial user data, to the retrieved IP address and port number combination.

With reference to FIGS. 5 and 8, the user search module 880 implements the encryption module 323 to encrypt the EP2P user search request. The encryption module 323 carries out the same actions described heretofore. As the outgoing cipher has already been initialized for the retrieved IP address and port number combination, the encryption module 323 skips blocks 543 to 546. In this instance, the resulting EP2P packet associated with the particular EP2P network includes the EP2P user search request, which includes the initial user data.

With reference to FIGS. 8 and 9, at block 993, the user search module 880 receives an EP2P user search response associated with the particular EP2P network from the retrieved IP address and port number combination.

With reference to FIGS. 6 and 8, the user search module 880 implements the decryption module 324 to decrypt the EP2P user search response. The decryption module 324 carries out the same actions described heretofore. As the incoming cipher has already been initialized for the retrieved IP address and port number combination, the decryption module 324 skips blocks 652 to 655. In this instance, the packet including the response is assumed to be an EP2P packet associated with the particular EP2P network including the EP2P user search response, and the whole packet is decrypted. A checksum comparison may still be performed, at block 659, to verify that the packet including the response has been successfully decrypted, if desired.

With reference to FIGS. 8 and 9, the user search module 880 analyzes the decrypted EP2P user search response to determine whether the EP2P user search response includes an initial user ID, at block 994. If the EP2P user search response does include an initial user ID, the user search module 880 extracts the initial user ID from the EP2P user search response, at block 995. Moreover, the user search module 880 determines that the initial user data and the initial user ID belong to an initial EP2P user associated with the particular EP2P network, at block 996. The user search module 880 stores the initial user data for the initial EP2P user and the initial user ID of the initial EP2P user in the database 212. The user search module 880 then forwards the initial user ID to the user data module 881. It should be noted that if a user ID belonging to a user associated with the particular network is already known, the user search may be skipped.

Accordingly, the user data module 881 receives the initial user ID and the retrieved IP address and port number combination of the active EP2P directory node from the user search module 880. At block 997, the user data module 881 sends an EP2P user data request associated with the particular EP2P network, including the initial user ID, to the retrieved IP address and port number combination. For example, the EP2P user data request may be a public IP address and port number combination discovery request, a private IP address and port number combination discovery request, a hardware identification request, or a software identification request.

With reference to FIGS. 5 and 8, the user data module 881 implements the encryption module 323 to encrypt the EP2P user data request. The encryption module 323 carries out the same actions described heretofore. As the outgoing cipher has already been initialized for the retrieved IP address and port number combination, the encryption module 323 skips blocks 543 to 546. In this instance, the resulting EP2P packet associated with the particular EP2P network includes the EP2P user data request, which includes the initial user ID.

With reference to FIGS. 8 and 9, at block 998, the user data module 881 receives an EP2P user data response associated with the particular EP2P network from the retrieved IP address and port number combination. For example, the EP2P user data response may be a public IP address and port number combination discovery response, a private IP address and port number combination discovery response, a hardware identification response, or a software identification response.

With reference to FIGS. 6 and 8, the user data module 881 implements the decryption module 324 to decrypt the EP2P user data response. The decryption module 324 carries out the same actions described heretofore. As the incoming cipher has already been initialized for the retrieved IP address and port number combination, the decryption module 324 skips blocks 652 to 655. In this instance, the packet including the response is assumed to be an EP2P packet associated with the particular EP2P network including the EP2P user data response, and the whole packet is decrypted. A checksum comparison may still be performed, at block 659, to verify that the packet including the response has been successfully decrypted, if desired.

At block 999, the user search data module 881 analyzes the decrypted EP2P user data response to determine whether the EP2P user data response includes new user data. If the EP2P user data response does include new user data, the user data module 881 extracts the new user data from the EP2P user data response, at block 1000. Moreover, the user data module 881 determines that the new user data belongs to the initial EP2P user associated with the particular EP2P network, at block 1001. The user data module 881 stores the new user data for the initial EP2P user in the database 212. For example, the new user data may include a public IP address and port number combination, a private IP address and port number combination, hardware information, software information, or a combination thereof.

The user data discovery process may be repeated to collect additional user data for the initial EP2P user. The user data discovery process may also be repeated periodically to detect any changes in the user data that has already been collected. If a change is detected, the user data is updated in the database 212.

With reference to FIG. 2, user information for discovered EP2P users is stored in the database 212. The user information for each discovered EP2P user includes a user ID and user data. As mentioned heretofore, the user data may include a real name, a user name, an age, a country, a language, an email address, a client ID, a public IP address and port number combination, a private IP address and port number combination, a geographical location, hardware information, software information, or a combination thereof, and is updated whenever a change is detected.

With reference to FIGS. 2 and 8, the user behavior module 882 enables the analysis of the user information collected and stored in the database 212 by the user search module 880 and the user data module 881. The user behavior module 882 periodically retrieves some or all of the user data for a discovered EP2P user from the database 212 and builds a user behavior pattern for the discovered EP2P user with the retrieved user data. Typically, the user behavior module 882 retrieves and analyzes the public IP address and port number combination and the private IP address and port number combination of the discovered EP2P user to determine the geographical location of the discovered EP2P user at a certain point in time. Preferably, the user behavior module 882 also retrieves and analyzes the hardware information and software information of the discovered EP2P user to obtain further insight into the behavior of the discovered EP2P user at that point in time. The user behavior module 882 then repeats the retrieval and analysis periodically to build a user behavior pattern for the discovered EP2P user. Thereby, the discovered EP2P user may be tracked.

With reference to FIG. 2, the administration console 215 enables the reporting of the node information and the user information collected, as well as the management of the node discovery process and the user data discovery process. Generally, the administration console 215 presents a user interface, preferably, a graphical user interface (GUI) on a display device. In some instances, the administration console 215 or parts thereof may be included in the discovery agent 211.

The administration console 215 retrieves and reports information stored in the database 212 by the discovery agent 211, the correlation module 213, and the user tracking system 214. For example, the information retrieved and reported may include: node information, such as IP address and port number combinations, statuses, relationships, types, transport protocols, and timestamps, collected by the discovery agent 211; network topological maps generated by the correlation module 213; user information, such as user IDs, real names, user names, ages, countries, languages, email addresses, client IDs, public IP address and port number combinations, private IP address and port number combinations, geographical locations, hardware information, and software information, collected by the user tracking system 214; user behavior patterns generated by the user tracking system 214; or a combination thereof. The information may be displayed in graphical or tabular format.

The administration console 215 also allows information to be provided, for instance, by a system administrator, to the discovery agent 211, the correlation module 213, and the user tracking system 214. For example, the administration console 215 may be used to provide the one or more initial IP addresses to the discovery agent 211, or the initial user data to the user tracking system 214. The administration console 215 may also, for example, be used to control the discovery of EP2P nodes and the collection of node information by the discovery agent 211, the mapping of node information by the correlation module 213, or the discovery of EP2P users, the collection of user information, and the analysis of user behavior by the user tracking system 214.

In summary, the present invention provides methods and discovery systems for discovering EP2P nodes associated with a particular EP2P network. In various embodiments, the present invention allows: the scanning of ports for EP2P connections associated with the particular EP2P network; the discovery of active EP2P nodes associated with the particular EP2P network by using EP2P requests and responses associated with the particular EP2P network; the collection and reporting of node information for discovered EP2P nodes; the mapping of the network topology of the particular EP2P network; the discovery of EP2P users associated with the particular EP2P network by using EP2P requests and responses associated with the particular EP2P network; the collection and reporting of user information for discovered EP2P users; and the analysis of the behavior of discovered EP2P users.

Of course, numerous other embodiments may be envisaged without departing from the spirit and scope of the invention.

We claim:

1. A discovery system for discovering encrypted peer-to-peer (EP2P) nodes associated with a particular EP2P network, embodied in one or more non-transitory computer-readable storage media and executable by one or more processors, comprising:
    said one or more processors;
    a database including:
        node information for discovered EP2P nodes associated with the particular EP2P network, wherein the node information for each discovered EP2P node includes an IP address and port number combination, a status, and a relationship; and
    one or more discovery agents, each discovery agent including:
        a port scanner module for receiving one or more initial IP addresses, each having a plurality of port numbers, for sending an EP2P connection request associated with the particular EP2P network to each initial IP address and port number combination, for if a response is received from a particular initial IP address and port number combination, determining whether the response is an EP2P connection response associated with the particular EP2P network, for if the response is determined to be an EP2P connection response associated with the particular network, determining that the particular initial IP address and port number combination belongs to an initial EP2P node associated with the particular EP2P network, having an active status, wherein for storing the particular initial IP address and port number combination of the initial EP2P node in the database, and for storing the active status of the initial EP2P node in the database; and
        a node discovery module for receiving the particular initial IP address and port number combination from the port scanner module, for sending an EP2P discovery request associated with the particular EP2P network to the particular initial IP address and port number combination, for receiving an EP2P discovery response associated with the particular EP2P network from the initial IP address and port number combination, for determining whether the EP2P discovery response includes one or more new IP address and port number combinations, for if the EP2P discovery response includes one or more new IP address and port number combinations, extracting the one or more new IP address and port number combinations from the EP2P discovery response and determining that the one or more new IP address and port number combinations belong to one or more new EP2P nodes associated with the particular EP2P network, each having an unknown status and each having a relationship to the initial EP2P node, wherein for storing the one or more new IP address and port number combinations of the one or more new EP2P nodes in the database, for storing the unknown status of each new EP2P node in the database, and for storing the relationship of each new EP2P node to the initial EP2P node in the database.

2. The discovery system of claim 1, wherein each discovery agent further includes:
    an encryption module for initializing an outgoing cipher associated with the particular EP2P network, for encrypting the EP2P connection request by using the initialized outgoing cipher, and for encrypting the EP2P discovery request by using the initialized outgoing cipher; and
    a decryption module for initializing an incoming cipher associated with the particular EP2P network, for attempting to decrypt the response by using the initialized incoming cipher, and for decrypting the EP2P discovery response by using the initialized incoming cipher;
wherein the port scanner module is for if the response is successfully decrypted, determining that the response is an EP2P connection response associated with the particular EP2P network.

3. The discovery system of claim 1,
    wherein the port scanner module is also for receiving the one or more new IP address and port number combinations from the node discovery module, for sending an EP2P connection request associated with the particular EP2P network to each new IP address and port number combination, for if a response is received from a particular new IP address and port number combination, determining whether the response is an EP2P connection response associated with the particular EP2P network, and for if the response is determined to be an EP2P connection response associated with the particular EP2P network, determining that a particular new EP2P node to which the particular new IP address and port number combination belongs has an active status, and for updating the database with the active status of the particular new EP2P node.

4. The discovery system of claim 1, wherein the discovery system is a distributed discovery system for discovering all the EP2P nodes associated with the particular EP2P network, comprising a plurality of discovery agents;
 wherein the database is a centralized database accessible by the plurality of discovery agents; and
 wherein each discovery agent is located in a different segment of the particular EP2P network, and is for discovering all the EP2P nodes associated with the particular EP2P network that are located in that segment.

5. The discovery system of claim 1, wherein the node information for each discovered EP2P node further includes a type; and
 wherein each discovery agent further includes:
  a type identification module for receiving the EP2P discovery response from the node discovery module, for analyzing the EP2P discovery response to identify a type of the initial EP2P node, and for storing the type of the initial EP2P node in the database.

6. The discovery system of claim 5, further comprising:
 a correlation module for retrieving some or all of the node information from the database, and for building a network topological map of an EP2P network associated with the particular EP2P network with the retrieved node information.

7. The discovery system of claim 5, wherein the status of each discovered EP2P node includes an active status, an inactive status, or an unknown status, and wherein the type of each discovered EP2P node includes a general type, a relay type, or a directory type.

8. The discovery system of claim 7, wherein the database further includes:
 user information for discovered EP2P users associated with the particular EP2P network, wherein the user information for each discovered EP2P user includes a user identifier (ID) and user data;
the discovery system further comprising:
a user tracking system including:
 a user search module for receiving initial user data, for retrieving an IP address and port number combination of a discovered EP2P node having an active status and a directory type from the database, for sending an EP2P user search request associated with the particular EP2P network including the initial user data to the retrieved IP address and port number combination, for receiving an EP2P user search response associated with the particular EP2P network from the retrieved IP address and port number combination, for determining whether the EP2P user search response includes an initial user ID, for if the EP2P user search response includes an initial user ID, extracting the initial user ID from the EP2P user search response and determining that the initial user data and the initial user ID belong to an initial EP2P user associated with the particular EP2P network, and for storing the initial user data for the initial EP2P user and the initial user ID of the initial EP2P user in the database.

9. The discovery system of claim 8, wherein the user tracking system further includes:
 a user data module for receiving the initial user ID and the retrieved IP address and port number combination from the user search module, for sending an EP2P user data request associated with the particular EP2P network including the initial user ID to the retrieved IP address and port number combination, for receiving an EP2P user data response associated with the particular EP2P network from the retrieved IP address and port number combination, for determining whether the EP2P user data response includes new user data, for if the EP2P user information response includes new user data, extracting the new user data from the EP2P user information response and determining that the new user data belongs to the initial EP2P user, and for storing the new user data for the initial EP2P user in the database.

10. The discovery system of claim 9, wherein the user data for each discovered EP2P user includes a real name, a user name, an age, a country, a language, an email address, a client ID, a public IP address and port number combination, a private IP address and port number combination, a geographical location, hardware information, software information, or a combination thereof.

11. The discovery system of claim 9, wherein the user tracking system further includes:
 a user behavior module for periodically retrieving some or all of the user data for a discovered EP2P user from the database, and for building a user behavior pattern for the discovered EP2P user with the retrieved user data.

12. A method of discovering EP2P nodes associated with a particular EP2P network, executed by one or more processors comprising:
 1) receiving, by said one or more processors, one or more initial IP addresses, each having a plurality of port numbers;
 2) sending an EP2P connection request associated with the particular EP2P network to each initial IP address and port number combination;
 3) if a response is received from a particular initial IP address and port number combination, determining whether the response is an EP2P connection response associated with the particular EP2P network;
 4) if the response is determined to be an EP2P connection response associated with the particular network, determining that the particular initial IP address and port number combination belongs to an initial EP2P node associated with the particular EP2P network, having an active status;
 5) sending an EP2P discovery request associated with the particular EP2P network to the particular initial IP address and port number combination;
 6) receiving an EP2P discovery response associated with the particular EP2P network from the particular initial IP address and port number combination;
 7) determining whether the EP2P discovery response includes one or more new IP address and port number combinations;
 8) if the EP2P discovery response includes one or more new IP address and port number combinations, extracting the one or more new IP address and port number combinations from the EP2P discovery response and determining that the one or more new IP address and port number combinations belong to one or more new EP2P nodes associated with the particular EP2P network, each having an unknown status and each having a relationship to the initial EP2P node; sending an EP2P connection request associated with the particular EP2P network to each new IP address and port number combination; if a response is received from a particular new IP address and port number combination, determining whether the response is an EP2P connection response associated with the particular EP2P network; and if the response is determined to be an EP2P connection response associated with the particular EP2P network, determining that a particular new EP2P node to which the particular new IP address and port number combination belongs has an active status.

13. The method of claim 12, wherein 2) includes:
initializing an outgoing cipher associated with the particular EP2P network; and
encrypting the EP2P connection request by using the initialized outgoing cipher;
wherein 3) includes:
initializing an incoming cipher associated with the particular EP2P network;
attempting to decrypt the response by using the initialized incoming cipher; and
if the response is successfully decrypted, determining that the response is an EP2P connection response associated with the particular EP2P network;
wherein 5) includes:
encrypting the EP2P discovery request by using the initialized outgoing cipher; and
wherein 6) includes:
decrypting the EP2P discovery response by using the initialized incoming cipher.

14. A method of discovering EP2P nodes associated with a particular EP2P network, executed by one or more comprising:
1) receiving, by said one or more processors, one or more initial IP addresses, each having a plurality of port numbers;
2) sending an EP2P connection request associated with the particular EP2P network to each initial IP address and port number combination;
3) if a response is received from a particular initial IP address and port number combination, determining whether the response is an EP2P connection response associated with the particular EP2P network;
4) if the response is determined to be an EP2P connection response associated with the particular network, determining that the particular initial IP address and port number combination belongs to an initial EP2P node associated with the particular EP2P network, having an active status;
5) sending an EP2P discovery request associated with the particular EP2P network to the particular initial IP address and port number combination;
6) receiving an EP2P discovery response associated with the particular EP2P network from the particular initial IP address and port number combination;
7) determining whether the EP2P discovery response includes one or more new IP address and port number combinations;
8) if the EP2P discovery response includes one or more new IP address and port number combinations, extracting the one or more new IP address and port number combinations from the EP2P discovery response and determining that the one or more new IP address and port number combinations belong to one or more new EP2P nodes associated with the particular EP2P network, each having an unknown status and each having a relationship to the initial EP2P node; and
9) analyzing the EP2P discovery response to identify a type of the initial EP2P node.

15. The method of claim 14, further comprising:
repeating 1) to 9) until an IP address and port number combination, a status, a relationship, and a type have been determined for each EP2P node associated with the particular EP2P network; and building a network topological map of the particular EP2P network with the IP address and port number combination, the status, the relationship, and the type of each EP2P node.

16. The method of claim 14, further comprising:
receiving initial user data;
if the type of the initial EP2P node is determined to be a directory type, sending an EP2P user search request associated with the particular EP2P network including the initial user data to the initial IP address and port number combination;
receiving an EP2P user search response associated with the particular EP2P network from the initial IP address and port number combination;
determining whether the EP2P user search response includes an initial user ID; and
if the EP2P user search response includes an initial user ID, extracting the initial user ID from the EP2P user search response and determining that the initial user data and the initial user ID belong to an initial EP2P user associated with the particular EP2P network.

17. The method of claim 16, further comprising:
i) sending an EP2P user data request associated with the particular EP2P network including the initial user ID to the initial IP address and port number combination;
ii) receiving an EP2P user data response associated with the particular EP2P network from the initial IP address and port number combination;
iii) determining whether the EP2P user data response includes new user data; and
iv) if the EP2P user information response includes new user data, extracting the new user data from the EP2P user information response and determining that the new user data belongs to the initial EP2P user.

18. The method of claim 17, further comprising:
repeating i) to iv) periodically to build a user behavior pattern for the initial user.

19. One or more non-transitory computer-readable storage media comprising instructions that, when executed by one or more processors, perform a method of discovering EP2P nodes associated with a particular EP2P network, the method comprising:
1) receiving one or more initial IP addresses, each having a plurality of port numbers;
2) sending an EP2P connection request associated with the particular EP2P network to each initial IP address and port number combination;
3) if a response is received from a particular initial IP address and port number combination, determining whether the response is an EP2P connection response associated with the particular EP2P network;
4) if the response is determined to be an EP2P connection response associated with the particular network, determining that the particular initial IP address and port number combination belongs to an initial EP2P node associated with the particular EP2P network, having an active status;
5) sending an EP2P discovery request associated with the particular EP2P network to the particular initial IP address and port number combination;
6) receiving an EP2P discovery response associated with the particular EP2P network from the particular initial IP address and port number combination;
7) determining whether the EP2P discovery response includes one or more new IP address and port number combinations;
8) if the EP2P discovery response includes one or more new IP address and port number combinations, extracting the one or more new IP address and port number combinations from the EP2P discovery response and determining that the one or more new IP address and port number combinations belong to one or more new EP2P nodes associated with the particular EP2P network, each having an unknown status and each having a relationship to the initial EP2P node;

sending an EP2P connection request associated with the particular EP2P network to each new IP address and port number combination;

if a response is received from a particular new IP address and port number combination, determining whether the response is an EP2P connection response associated with the particular EP2P network; and if the response is determined to be an EP2P connection response associated with the particular EP2P network, determining that a particular new EP2P node to which the particular new IP address and port number combination belongs has an active status.

20. One or more non-transitory computer-readable storage media comprising instructions that, when executed by one or more processors, perform a method of discovering EP2P nodes associated with a particular EP2P network, the method comprising:

1) receiving one or more initial IP addresses, each having a plurality of port numbers;
2) sending an EP2P connection request associated with the particular EP2P network to each initial IP address and port number combination;
3) if a response is received from a particular initial IP address and port number combination, determining whether the response is an EP2P connection response associated with the particular EP2P network;
4) if the response is determined to be an EP2P connection response associated with the particular network, determining that the particular initial IP address and port number combination belongs to an initial EP2P node associated with the particular EP2P network, having an active status;
5) sending an EP2P discovery request associated with the particular EP2P network to the particular initial IP address and port number combination;
6) receiving an EP2P discovery response associated with the particular EP2P network from the particular initial IP address and port number combination;
7) determining whether the EP2P discovery response includes one or more new IP address and port number combinations;
8) if the EP2P discovery response includes one or more new IP address and port number combinations, extracting the one or more new IP address and port number combinations from the EP2P discovery response and determining that the one or more new IP address and port number combinations belong to one or more new EP2P nodes associated with the particular EP2P network, each having an unknown status and each having a relationship to the initial EP2P node; and
9) analyzing the EP2P discovery response to identify a type of the initial EP2P node.

* * * * *